J. A. FRITSCH.
MACHINE FOR PLANTING GARLIC, SET ONIONS, AND THE LIKE.
APPLICATION FILED MAY 9, 1911.

1,027,119.

Patented May 21, 1912.

3 SHEETS—SHEET 1.

J. A. FRITSCH.
MACHINE FOR PLANTING GARLIC, SET ONIONS, AND THE LIKE.
APPLICATION FILED MAY 9, 1911.

1,027,119.

Patented May 21, 1912.
3 SHEETS—SHEET 2.

Witnesses
C. M. Wenrich
A. Lyda Jones.

Inventor
John A. Fritsch
by A. Miller Belfield
Atty

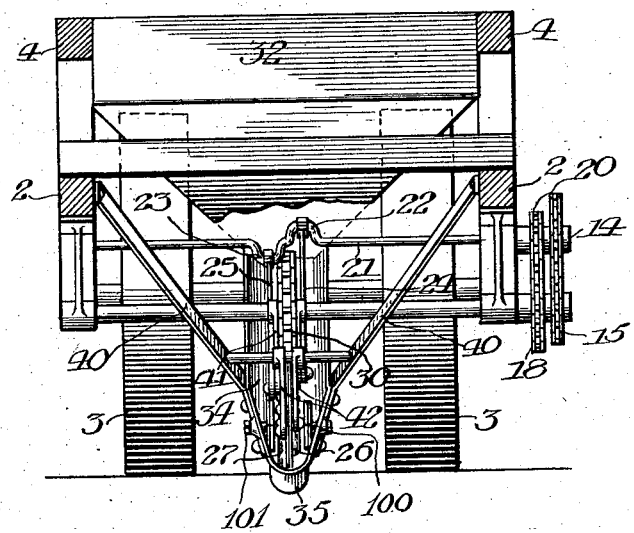

UNITED STATES PATENT OFFICE.

JOHN A. FRITSCH, OF SHERMERVILLE, ILLINOIS.

MACHINE FOR PLANTING GARLIC, SET-ONIONS, AND THE LIKE.

1,027,119.   Specification of Letters Patent.   Patented May 21, 1912.

Application filed May 9, 1911. Serial No. 625,939.

*To all whom it may concern:*

Be it known that I, JOHN A. FRITSCH, a citizen of the United States, residing at Shermerville, in the county of Cook and State of Illinois, have invented a certain new and useful Improvement in Machines for Planting Garlic, Set - Onions, and the Like, of which the following is a full, clear, concise, and exact description, reference being had to the accompanying drawings, forming a part of this specification.

My invention relates to an apparatus for planting onion sets and garlic, and has as its object to produce a device capable of quickly and easily planting bulbs and sets of various sorts, but especially adapted for the planting of onion sets.

Further objects will be apparent to those skilled in the art in the particular combinations and arrangements of parts hereinafter described.

Figure 1:
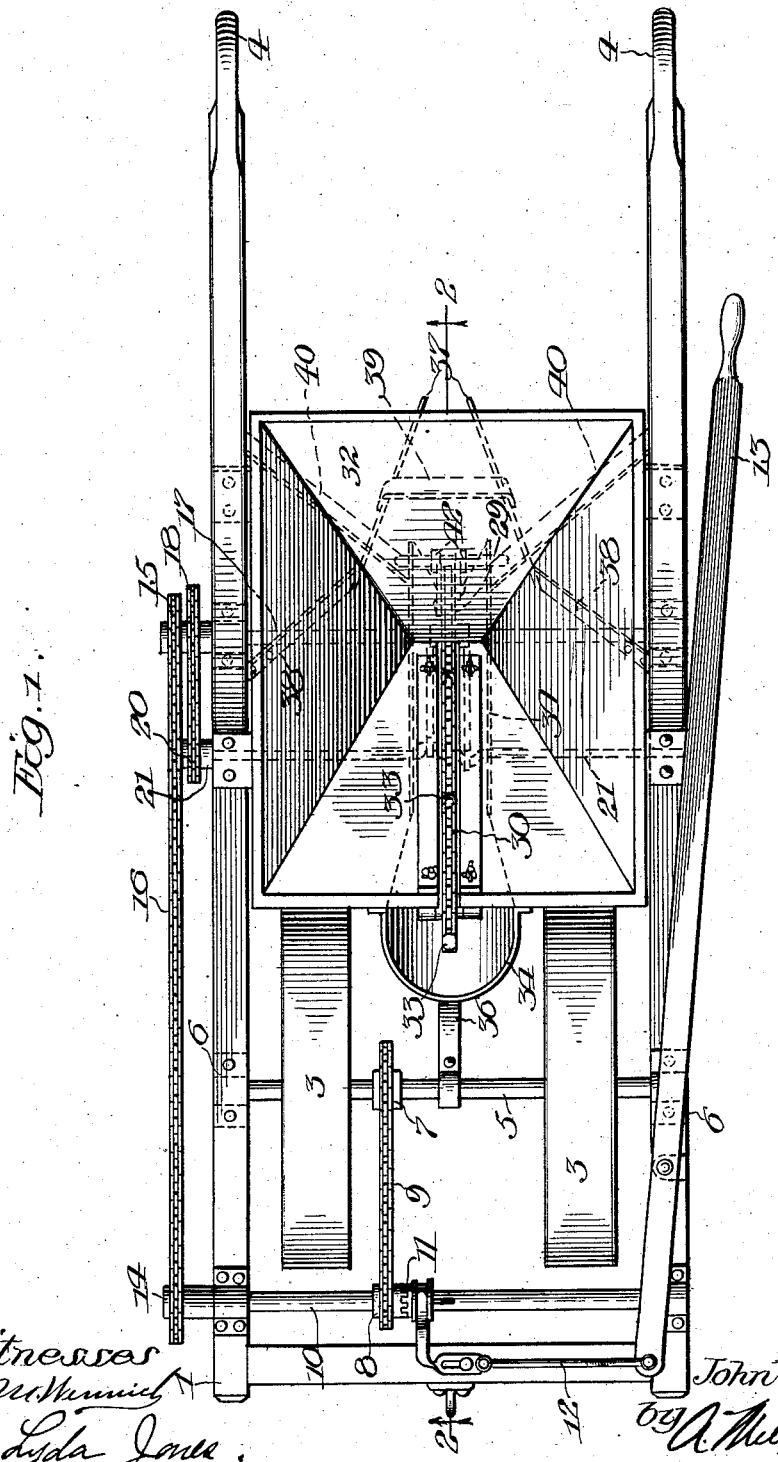
Figure 2:
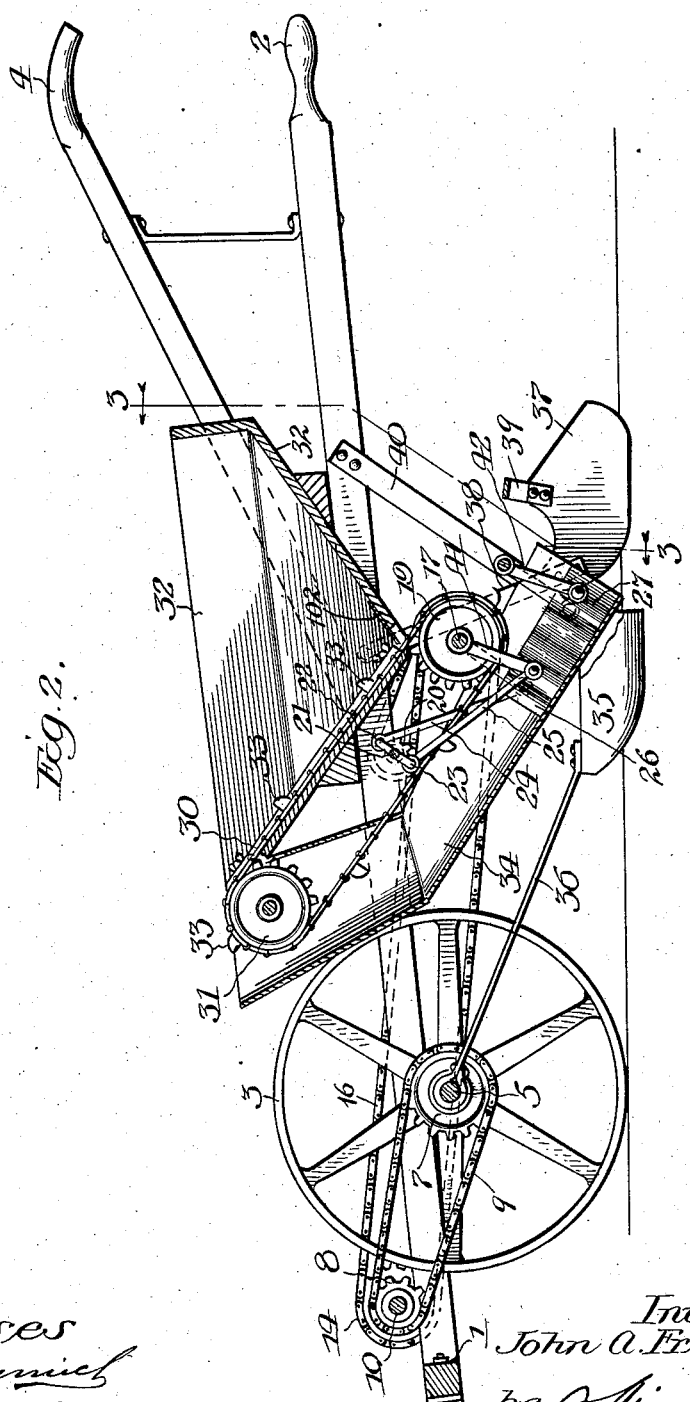

In the accompanying drawings Figure 1 is a plan view of my device; Fig. 2 is a longitudinal sectional elevation taken on the line 2—2 of Fig. 1; Fig. 3 is a cross section taken on the line 3—3 of Fig. 2; Fig. 4 is a detail view of the feeding mechanism.

Throughout the specification the same element is referred to by the same reference character.

Referring more particularly to the drawings, 1 denotes the frame of my device, at one end of which is a handle 2 for lifting the rear of the machine so as to throw the weight upon the wheels 3—3. Additional handles 4—4 are provided for guiding the machine when it is in the position shown in Fig. 2. The wheels 3—3 are carried on a shaft or axle 5 journaled at 6—6 in the frame of the machine. Shaft 5 carries a sprocket wheel 7 which drives the sprocket 8 by means of a chain 9. Sprocket 8 is loosely carried on the shaft 10 but may be clutched to drive said shaft by means of a clutch 11, which is operated through link 12 and lever 13. Carried on one end of the shaft 10 is a wheel 14 which drives wheel 15 by means of chain 16. Wheel 15 is mounted on shaft 17 which shaft also carries wheels 18 and 19. Wheel 18 drives through chain connection the wheel 20 which turns the shaft 21. Referring more especially to Figs. 2, 3 and 4 it will be seen that shaft 21 is provided with two crank portions 22 and 23, to which rods 24 and 25 are respectively attached. To the ends of rods 24 and 25 are fastened reciprocating plates 26 and 27, made of corrugated material, plates 26 and 27 being suspended from the frame of the machine by means of links 41 and 42, which are carried by the shaft 17 and by the brace 40 respectively. Stationarily mounted outside of these plates 26 and 27 are plates 28 and 29, also of corrugated material. Plates 28 and 29 are adjustably mounted on screws 100 which project through the sides of the trough 34, as shown in Figs. 3 and 4. In this way the distance between the fixed and movable plates can be varied to accommodate the device for feeding objects of different sizes. These plates operate to feed the onion sets into the ground, as in connection with mechanism hereafter described.

The wheel 19 above referred to drives a conveyer chain 30 which runs also over a wheel 31. The upper side of the chain passes through a hopper 32 in an obvious manner. Where the conveyer chain passes into the hopper the opening in the hopper is closed by a flexible member 101, (Fig. 2), which prevents the contents from falling out but which opens inwardly to allow the buckets to enter the hopper. The conveyer buckets 33 carry individual sets from the hopper 32 into a trough 34 extending below the hopper and attached to the frame of the machine by braces 40—40. The plates 26, 27, 28 and 29 above referred to are carried in the lower portion of the trough 34. In front of the lower end of the trough is a wedge or plow 35 for forming a furrow in the soil into which the lower end of the trough extends. Plow 35 is drawn by the axle 5 by means of a rod 36. Behind the end of the trough 34 are plates 37—37 which serve to close the furrow formed by the plow 35 and so cover up the onion sets. Plates 37 are attached to the frame by means of pieces 38. They are also connected together by means of a cross piece 39 so that the pressure of the soil will not separate them.

The operation of my device is as follows: Onion sets or bulbs are placed in the hopper 32. The machine is then pushed or pulled over the ground to be planted and the plow 35 lowered into the position shown in Fig. 2. As the machine goes forward the conveyer 30 carries sets or bulbs from the hopper 32 into the trough 34 where they are caught by the reciprocating plates 26 and 27 and by means of successive reciprocations fed forward over the corrugated plates 28 and 29 and then dropped into the furrow behind the plow 35. The furrow is immediately covered by the plates 37.

It will be understood that while I have shown and described the preferred form of my invention, that I contemplate all such changes and modifications as are comprised within scope of the appended claims.

What I claim is:

1. In a seed planter in combination, a hopper, a conveyer passing through said hopper, a trough underlying said hopper and conveyer, seed feeding means positioned in said trough, and means to adjust said feeding means for objects of different sizes.

2. A seed planter comprising a substantially plane corrugated stationary plate and a substantially plane corrugated reciprocating plate moving over the face of said stationary plate.

3. In a seed planter in combination, a hopper, a conveyer passing through said hopper, a trough into which said conveyer delivers, and feeding mechanism operated in synchronism with said conveyer, and means to adjust said feeding means for objects of different sizes.

4. A device of the class described comprising a frame, wheels having a shaft journaled in said frame, a shaft geared to said wheel shaft, a clutch carried on said second shaft, a conveyer shaft geared to said clutch shaft, a crank shaft geared to said conveyer shaft, links operated by said crank shaft, reciprocating plates driven by said links, stationary plates inclosing said reciprocating plates and links for supporting the weight of said reciprocating plates.

5. A seed planter comprising stationary corrugated plates, reciprocating plates positioned between said corrugated plates, pivoted links carrying the weight of said reciprocating plates and links for reciprocating said plates.

6. A seed planter comprising a shaft, a conveyer driven by said shaft, stationary corrugated plates, reciprocating plates coöperating with said stationary plates, and means for driving said reciprocating plates from said conveyer shaft.

7. A planting machine comprising in combination a portable frame, furrow forming means carried by said frame, a hopper, a trough, means for feeding material to be planted from said hopper into said trough, means within said trough for feeding said material into a furrow, and means to adjust said feeding means for objects of different sizes.

8. A planting machine comprising in combination a pair of stationary plates and a pair of movable plates carried between said stationary plates, each of said movable plates being suspended by a plurality of links, and means for reciprocating the movable plates.

9. A planting machine comprising in combination a stationary plate and a movable plate coöperating therewith, said movable plate being suspended by a plurality of links from points substantially in the plane of the plates, and means for reciprocating said movable plate, said plates being substantially parallel.

10. A device for planting bulbs comprising in combination furrow forming means and feeding means coöperating therewith, including a substantially plane stationary plate mounted in a vertical plane, a substantially plane movable plate coöperating therewith carried adjacent to said stationary plate, and means for reciprocating said movable plate in a direction substantially parallel to said stationary plate.

11. In a planting machine in combination, a frame, a wheel axle supporting said frame, a hopper carried by said frame, a conveyer for withdrawing material from said hopper, a sprocket drive for operating said conveyer from said axle, a feeding device adapted to receive material from said conveyer, means for operating said feeding device in synchronism with said conveyer, and means to adjust said feeding device for objects of different sizes.

12. In a planting device in combination, a portable frame, a hopper carried by said frame, means for withdrawing material from said hopper, a feeding device for receiving the material from said means, said device comprising stationary plates, and reciprocating plates coöperating with said stationary plates, each of said reciprocating plates being suspended by a plurality of links from a plurality of points of suspension.

13. A planting machine comprising in combination, a stationary plate, a movable plate coöperating therewith, being mounted in substantially parallel planes, and one of said plates being roughened, and means for operating said movable plate in a plane substantially parallel to said stationary plate.

14. A planting machine comprising in combination, a stationary plate, a movable plate coöperating therewith, one of said plates being roughened, means for operating said movable plate in a plane substantially parallel to said stationary plate, and means for adjusting the relative position of said plates to handle objects of different sizes.

15. A planting machine comprising in combination, a stationary element, a movable element coöperating therewith, one of said elements having a roughened surface, means for operating said movable element, and means for adjusting the relative position of said elements to handle objects of different sizes.

16. A planting machine comprising in combination, a stationary element, a movable element coöperating therewith, one of said elements being roughened and one of said elements being substantially plane, means for operating said movable element, and means for adjusting the relative position of said elements to handle objects of different sizes.

17. A planting machine comprising in combination, a substantially plane corrugated stationary plate, and a substantially plane corrugated reciprocating plate moving back and forth over the face of said stationary plate, the corrugations on said plates being rounded in order to prevent damaging material to be planted.

18. A planting machine comprising in combination, a substantially plane vertical stationary plate having rounded corrugations thereon, a substantially plane moving plate also having rounded corrugations coöperating with said stationary plate, said moving plate being suspended from points lying exterior to the plate, but within substantially the same plane.

19. A planting machine comprising in combination, an inclined trough, a stationary corrugated plate mounted in said trough in a substantially vertical position and having its lower edge in close proximity to the surface of the trough, a reciprocating plate, also corrugated, suspended parallel to said stationary plate having its lower edge in close proximity to the surface of the trough.

20. A planting machine comprising in combination, a stationary plate and a reciprocating plate coöperating therewith, said plates being corrugated and mounted in substantially vertical parallel planes.

21. A planting machine comprising in combination, two corrugated plates mounted side by side, one of said plates being movable and having a substantially reciprocating motion, and a plurality of links for supporting said plate from a plurality of points of support.

In witness whereof, I hereunto subscribe my name this 5th day of May, A. D., 1911.

JOHN A. FRITSCH.

Witnesses:
  A. LYDA JONES,
  A. I. DENNISON.

---

Copies of this patent may be obtained for five cents each, by addressing the "Commissioner of Patents Washington, D. C."